(12) United States Patent
Novak et al.

(10) Patent No.: US 6,275,801 B1
(45) Date of Patent: Aug. 14, 2001

(54) NON-LEAF NODE PENALTY SCORE ASSIGNMENT SYSTEM AND METHOD FOR IMPROVING ACOUSTIC FAST MATCH SPEED IN LARGE VOCABULARY SYSTEMS

(75) Inventors: Miroslav Novak, Mohegan Lake; Michael Picheny, White Plains, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/184,870

(22) Filed: Nov. 3, 1998

(51) Int. Cl.$^7$ ................................................. G10L 15/14
(52) U.S. Cl. ..................................... 704/252; 704/255
(58) Field of Search ................................. 704/252, 255

(56) References Cited

U.S. PATENT DOCUMENTS 4,718,094 * 1/1988 Bahl et al. ............................ 704/256
5,729,656 * 3/1998 Nahamoo et al. .................... 704/254
6,058,363 * 5/2000 Ramalingam ........................ 704/251

OTHER PUBLICATIONS

Bahl et al., "A Fast Approximate Acoustic Match for Large Vocabulary Speech Recognition," IEEE Transactions on Speech and Audio Processing, vol. 1, No. 1, Jan. 1993.

\* cited by examiner

Primary Examiner—Tãlivaldis Ivars Šmits
(74) Attorney, Agent, or Firm—F. Chau & Associates, LLP

(57) ABSTRACT

A method for fast match processing, comprising two stages, a pre-processing stage and an on-line stage. The pre-processing stage comprises the steps of computing an a-priori probability of occurrence for each word from an acoustic vocabulary; deriving a penalty score for each word from said acoustic vocabulary based on each words a-priori probability of occurrence in an input text. The on-line stage operates on an input text stream, comprising the steps of, computing a path score for each word from said input text; combining the computed path score with the derived penalty score to form a combined score and testing the combined score against a threshold to determine top ranking candidate words.

10 Claims, 4 Drawing Sheets

NON-LEAF NODE PENALTY SCORE ASSIGNMENT SYSTEM AND METHOD FOR IMPROVING ACOUSTIC FAST MATCH SPEED IN LARGE VOCABULARY SYSTEMS

BACKGROUND OF THE INVENTION

1. Field of the Invention

The present invention relates to speech recognition, and, more particularly, to a method and system for improving the execution speed of an acoustic fast match.

2. Discussion of the Prior Art

In a speech recognition system using hidden Markov models, several thousand computations are required to compare each segment of acoustics against a pre-stored word model. Carrying out these computations for all words in the stored vocabulary is prohibitive if the goal is large vocabulary real-time speech recognition on a modest amount of hardware. In such a system, a matching algorithm is required that can rapidly identify a small set of candidate words from the whole acoustic vocabulary for further evaluation in a particular time region of the decoded utterance. In speech recognition systems based on an asynchronous stack search, the acoustic fast match provides the desired rapid identification capability. The acoustic fast match represents one of the three major functional components of a speech recognition system, the other two being the detailed match and the language model.

Conventional approaches to the implementation of the acoustic fast match can be divided into two major groups, the synchronous search and the asynchronous search. Synchronous searches suffer from several disadvantages. First, all the active word models have to be stored in memory, and thus memory requirements can be prohibitive in large vocabulary systems. Second, the estimation of word beginning probabilities requires the search to be performed in the backward direction, which significantly limits the use of this method in real time applications. For a discussion of this type of approach, see Austin, S., Schwartz, et. al, "The Forward-Backward Search Algorithm", ICASSP91, Toronto, Canada, pp. 697–700 (1991).

In the asynchronous search, for a given time region of a speakers utterance, a search is performed by computing the total acoustic score for each word in the acoustic vocabulary, one word at a time. Each word in the acoustic vocabulary is represented by its phonetic sequence (i.e. deal="d"–"eh"–"l"). To obtain the acoustic score of a particular word from the vocabulary, the acoustic scores of all of the individual phones that collectively define that word are computed and then combined into a single wordscore. To reduce the amount of computation, the phonetic sequences that define each word in the acoustic vocabulary are organized into a tree structure.

In addition to constructing an acoustic vocabulary tree structure, further computational savings may be realized by performing a pruning algorithm. Pruning operates by recognizing that when the tree is traversed to compute wordscores, the candidate words of interest will generate the highest word scores. More particularly, in an asynchronous search, a search algorithm traverses the tree structure from a root node along a nodal path where each node in the path represents a constituent phone of the word to be scored, if the computation of a partial word score at a particular node results in a value that falls below either some absolute threshold or is low when compared to other nodes, it is apparent at that time that all words derived from this node will be low, and as a consequence, the whole subtree can be ignored. This process is called pruning.

Despite the advantages achieved by utilizing a acoustic vocabulary tree structure along with a pruning algorithm, when the acoustic vocabulary becomes very large (e.g. more than 60,000 words) the time spent in the fast match algorithm can become very significant. Generally, the efficency of the algorithm is reduced in proportion to the increased vocabulary size since the fast match complexity is directly proportional to the number of words in the acoustic vocabulary. It is therefore desirable to devise an improved fast match algorithm that eliminates or significantly reduces the effects of increased vocabulary size on the algorithm's efficiency.

SUMMARY OF THE INVENTION

The problems stated above and the related problems of the prior art are solved with the method and system according to the present invention. In a speech recognition system, a method is provided that eliminates significantly reduces the effect of increased vocabulary size on the execution speed of the fast match algorithm. In particular, the existing asynchronous tree search based fast match algorithm is enhanced by an improved pruning algorithm.

In one aspect of the invention, a method for eliminating the effect of increased vocabulary size on the speed of the fast match comprises the steps of computing an a-priori probability of occurrence for each word from an acoustic vocabulary; deriving a penalty score for each word from said acoustic vocabulary based on each words a-priori probability of occurrence in an input text; analyzing said input text to: compute a path score for each word from said input text; and combine the computed path score with the derived penalty score to form a combined score and testing the combined score against a threshold to determine top ranking candidate words to be later processed by the detailed match.

These and other objects, features and advantages of the present invention will become apparent from the following detailed description of illustrative thereof, which is to be read in connection with the accompanying drawings.

DETAILED DESCRIPTION OF PREFERRED EMBODIMENTS

The present invention provides a fast algorithm for the acoustic fast match. The asynchronous tree search based fast match algorithm, well known in the prior art, is enhanced by an improved pruning algorithm, which utilizes the probability of occurrence of each word in the text being decoded to perform more effective pruning.

Enhancing the pruning algorithm by utilizing the probability of occurrence of each word in the vocabulary advantageously increases the speed of the acoustic fast match algorithm.

Figure 1:
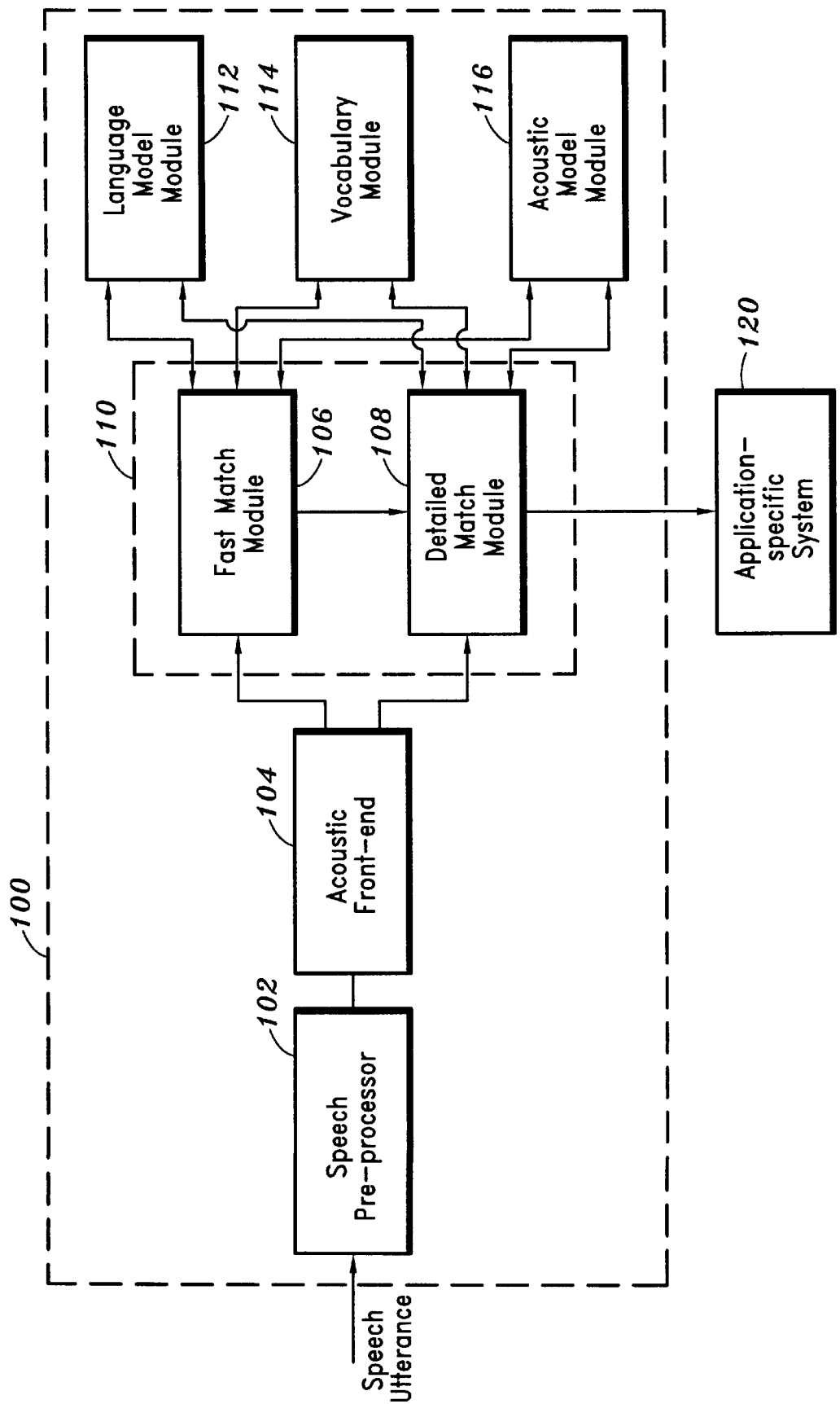
FIG. 1 is a block diagram of a speech recognition system to which the present invention is applied.

Referring initially to FIG. 1, a block diagram is shown of a speech recognition system 100 to which the present invention is applied, in conjunction with an application specific system 120. In FIG. 1, the speech recognition system 100 and its constituent components are described with respect to the conventional method for recognizing an input utterance to output a representative text.

The speech recognition system 100 includes a speech utterance pre-processor 102 operatively coupled to an acoustic front-end 104. The front-end 104 is also operatively coupled to a fast match module 106 and a detailed match module 108. The fast match module 106 and detailed match module 108, which are operatively coupled to each other, are collectively referred to as a recognizer 110. A language model module 112 (hereinafter "language model"), a vocabulary module 114 (hereinafter "vocabulary"), and an acoustic model module 116 (hereinafter "acoustic model") are each operatively coupled to both the fact match module and the detailed match module.

It is to be appreciated that the present invention is usable with any speech recognition system and is not, in any way, limited to use with or dependent on any details or methodologies of any particular speech recognition arrangement. For instance, generalized speech recognition systems such as the commercially available large vocabulary IBM ViaVoice or ViaVoice Gold systems may be employed in accordance with the invention. In any case, it should be understood that the elements illustrated in FIG. 1 may be implemented in various forms of hardware, software, or combinations thereof. As such, the main recognition elements (e.g., fast match module 106, detailed match module 108, language model 112, and acoustic model 116) are implemented in software on one or more appropriately programmed general purpose digital computers. Each general purpose digital computer may contain, for example, a central processing unit (CPU) operatively coupled to associated system memory, such as RAM, ROM and a mass storage device, via a computer interface bus. Accordingly, the software modules performing the functions described herein may be stored in ROM or mass storage and then loaded into RAM and executed by the CPU. As a result, FIG. 1 may be considered to include a suitable and preferred processor architecture for practicing the invention which may be achieved by programming the one or more general purpose processors. Of course, special purpose processors may be employed to implement the invention. Given the teachings of the invention provided herein, one of ordinary skill in the related art will be able to contemplate these and similar implementations of the elements of the invention.

A brief explanation of the functionality of the components of the speech recognition system 100 will now be given. The speech utterance pre-processor 102 receives the speech uttered by a speaker (spoken word sequence) and generates waveforms. The speech utterance pre-processor 102 may include an audio-to-analog transducer (microphone) and an analog-to-digital converter which respectively transduces the utterances into an electrical signal and then converts the electrical signal into a digital signal representative of the uttered speech. Further, the pre-processor may preferably sample the speech signal and partition the signal into overlapping frames so that each frame is discretely processed by the remainder of the system. The output signal of the pre-processor 102 is the sampled speech waveforms which are provided to an acoustic front-end 104. Alternatively, the acoustic front-end 104 may incorporate the functions of the pre-processor 102. The acoustic front-end 104, as is known in the art, generates feature vectors from the input utterance and labels from the feature vectors. The labels may be considered, in a general sense, to identify a corresponding phone. As is known, a phone is a basic unit of speech. It is to be appreciated that the pre-processor 102 and acoustic front-end 104 may be collectively referred to as an acoustic processor.

The speech recognition process is typically constrained by the acoustic model 116 which corresponds to the phones employed in the system 100, the vocabulary 114 which defines the vocabulary of the system in terms of these phones, and the language model 112 which specifies allowable sequences of vocabulary items.

The fast match module 106, which is based on the use of hidden markov models (HMMs) designed to examine all the words in the vocabulary and to reduce the number of candidate words (acoustically similar words) for a given string of incoming labels. That is, a list of candidate words is produced from the words in the vocabulary so that the number of words that require further processing is reduced. After the number of candidate words have been reduced by the fast match module, the contextual likelihoods associated with the language model are used to further reduce the number of candidate words. Then, the remaining candidate words are processed by detailed match module 108 to compute the likelihood of a segment of acoustics given a word model. The output of the recognizer 110 is based on the results obtained by the detailed match module.

The recognized word(s) output from the recognizer 110 are provided to the application-specific system 120. It is to be understood that the application-specific system 120 may be any system that employs the recognized speech signals as input. For example, the application-specific system 120 may be a telephone modem system whereby the spoken utterances received by the speech recognition system 100 represent text to be electronically forwarded to a remote location. The text could correspond to a speech by a newsworthy individual and the remote location could be a news service such as a newspaper. Of course, the above application is merely an example and, as such, the present invention is not intended to be limited thereby.

A more detailed explanation of the goal of the decoder 110 will now be given. The goal of the recognizer 110 is to find the word that has the maximum a posteriori probability given an observed acoustic input. That is, finding the word from the acoustic vocabulary that represents a best match to an observed acoustic input. Conventional approaches to this goal can be divided into two major groups, the synchronous search and the asynchronous search. The synchronous search is usually a form of the well known Viterbi algorithm. In the synchronous search, at each instance, all necessary computations are performed, so that the same time region of an utterance is never evaluated more than once. In the asynchronous search, for a given time region of the utterance, the search is performed by computation of the total acoustic score for each word in the vocabulary, one word at a time. Each of the two approaches has advantages and disadvantages.

The method of the present invention will be described with reference to an asynchronous search scheme, which is a tree-based search. Thus, a general description of the asynchronous tree based search scheme will now be provided.

Figure 2:
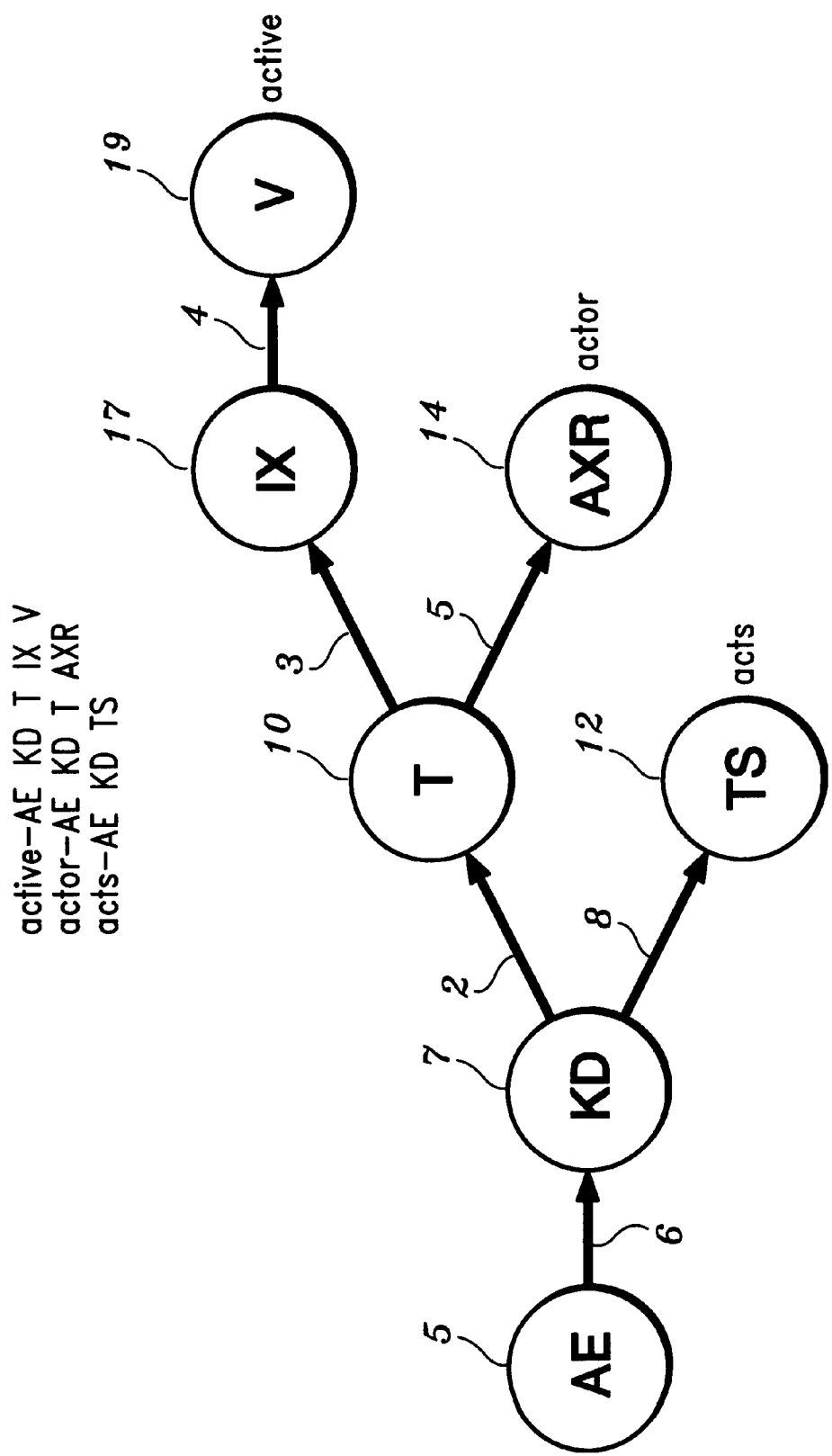
FIG. 2 illustrates a segment of an asychronous tree structure.

In an asynchronous fast match search, each word in the acoustic vocabulary is represented by a phonetic sequence. To obtain the acoustic score of a particular word from the vocabulary, the acoustic scores of all the individual phones in the phonetic sequence that make up that word are computed and combined into a single word score representing the final probability of the word. If two words share their first phones, the phonetic match need be performed only once and the result of the match can be used to continue in the matching of the remaining phones of each particular word. This commonality of phones allows the acoustic vocabulary to be organized into a acoustic vocabulary tree structure. For example, FIG. 2 illustrates a tree structure for three words (active, actor and acts) from an acoustic vocabulary that share their first phones (i.e. "AE" 5 and "KD" 7). The root 5 of the tree is a single node with one branch for each phone which can appear as a first phone in any of the vocabulary words. At any node, if there is a difference between the subsequent phones of two words, a new branch is created (i.e. branches 2 and 8). Leaves of the tree represent complete words and are illustrated as end nodes in the tree (i.e. 12, 14, and 19). The tree is traversed in a depth-first manner. Depth first tree traversals are well known in the art, and can be found extensively discussed in such references as Introduction to Algorithms, Cormen T. H., Leiserson C. E., and Rivest R. L, (MIT press), which is hereby incorporated by reference, and in many other widely available publications.

An asynchronous fast match search starts at the root node 5 and continues along the first branch 6 to the next node 7. At each subsequent node, a branch is chosen in accordance with the depth first search, and if the node to which this branch leads has further branches, one branch will be selected until a leaf node is reached. Then, a return back to a previous node is made and one of the remaining branches is selected for processing. Eventually, all branches will be traversed and all nodes visited. Whenever a leaf node is reached a final word (path) score is obtained by accumulation of the partial pathword scores, obtained by summing the constituent phone probabilities at each node in that word path. FIG. 2 shows the order in which the branches are traversed for the three word example.

It is generally known that the speed of the acoustic fast match search can be increased by limiting the number of visited nodes. Anytime the total probability of a tree path falls below a certain threshold, or is found to be low when compared to other nodes a return to the parent(previous) node is performed even if the leaf was not reached. That is, subsequent nodes, which represent the unanalyzed phones, in the word path will not be traversed. This process is called pruning. Pruning saves substantial time when performing the acoustic fast match by pre-empting the computation of word scores for those words whose partial word scores fall below some threshold.

In accordance with the teachings of the present invention, the asynchronous tree search based fast match algorithm is enhanced by an improved pruning algorithm, which utilizes the probability of occurrence of each word in the text being recognized to perform more effective pruning and thereby increase the speed of the acoustic fast match algorithm, as will be explained below.

The illustrative method of the present invention occurs in two-stages; a preprocessing stage and an on-line stage. The pre-processing stage is performed once the acoustic vocabulary prior to processing input text by the speech recognition system.

Pre-processing Stage

At the pre-processing stage, it is assumed that a large acoustic vocabulary, on the order of 60,000 words or more is pre-stored for recognition by a speech recognition system. In accordance with the invention, an apriori probability of occurrence will be computed and assigned to each of the 60,000 words in the acoustic vocabulary. The apriori probabilities are assigned on the basis on each word's probable likelihood of occurrence in the input text to be processed by the speech recognition system. Once probabilities are assigned to each word in the acoustic vocabulary, the vocabulary list is then sorted in accordance with the assigned probabilities. Penalty scores are then assigned to each word in the sorted list according to any number of criteria. In a preferred embodiment, penalties are assigned as a function of the words position in the sorted list. For example, for a typical vocabulary on the order of 60,000 words, the preferred embodiment would assign no penalty to the top 20,000 words in the sorted list. For the remainder of the list, penalties would be assigned in accordance with any non-decreasing function.

Figure 3:
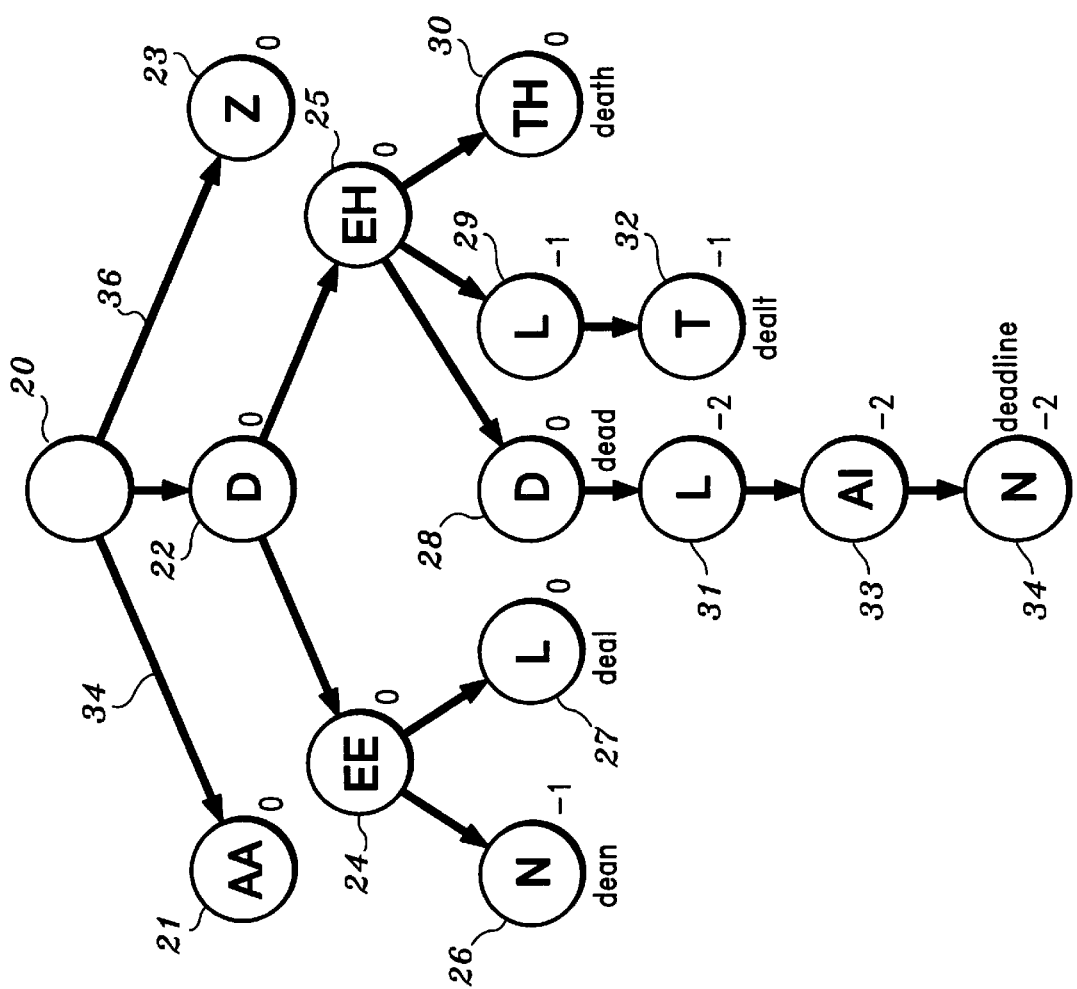
FIG. 3 illustrates a partial construction of an asynchronous tree structure with associated penalty scores associated with each node according to the invention.

Once the penalties for all the entire acoustic vocabulary have been assigned, an asynchronous tree structure is constructed. The construction of the asychronous tree will now be explained with reference to FIG. 3. Referring now to FIG. 3, an exemplary partial acoustic vocabulary tree structure is illustrated. Asynchronous tree structures typically include thousands of nodes, wherein each node represents either a word from the acoustic vocabulary or one of its phones. In the interest of clarity five words and their associated phones are described at FIG. 3. In general, the words which comprise the acoustic vocabulary are represented as leaf(end) nodes in the tree and non-leaf nodes represent the phones that comprise those words. Five leaf nodes {26, 27, 30, 32, and 34} representing five words from the acoustic vocabulary are illustrated in FIG. 3, each representing a particular word from the vocabulary list. Associated with each leaf node is its associated penalty score derived at the pre-processing stage. For example, leaf node 26 is associated with the vocabulary word "dean" having an associated penalty score of (-1).

The method by which the present invention assigns penalty scores to non-leaf nodes (i.e. 20–25, 28, 29, 31, and 33) from leaf node penalty scores, is best illustrated by way of example. To assign a penalty score, for example, to non-leaf node 24, the parent node to leaf nodes 26 and 27, the penalty scores for leaf nodes 26 and 27 are compared to determine the more positive value. That value will be assigned to non-leaf node 24. In this example node 24 would be assigned a penalty score of (0) the value associated with leaf node 27. This process is repeated for each non-leaf node in the tree. For those situations where only one child node exists, for example node 34, that node's penalty score is propagated up the tree, to nodes 33 and 31 in the present example, until a leaf node is reached with a previously assigned penalty score. At that point the two penalty scores are again compared with the selected score being the more positive value (i.e. lower penalty score). In this example, leaf node 28 has a more positive penalty score (0), hence the penalty score associated with node 31 (-2) will not be propagated to node 28. Once penalty scores are assigned to all leaf and non-leaf nodes in the tree the pre-processing stage is complete.

On-Line Stage

Following the pre-processing stage, real-time speech processing of a sampled speech waveform (input text)occurs at the on-line stage. Referring again to FIG. 1, at the on-line stage a sampled speech waveform is received as input from the acoustic front-end 104 by the recognizer 110. In the decoder 110, a fast match module 106 performs an acoustic fast match to process the sampled speech waveform and rapidly generate a small set of candidate words from the whole acoustic vocabulary for further evaluation by the detailed match module 108. The acoustic fast match operates by traversing the acoustic vocabulary tree, constructed at the pre-processing stage in a manner to be described with below.

Figure 4:
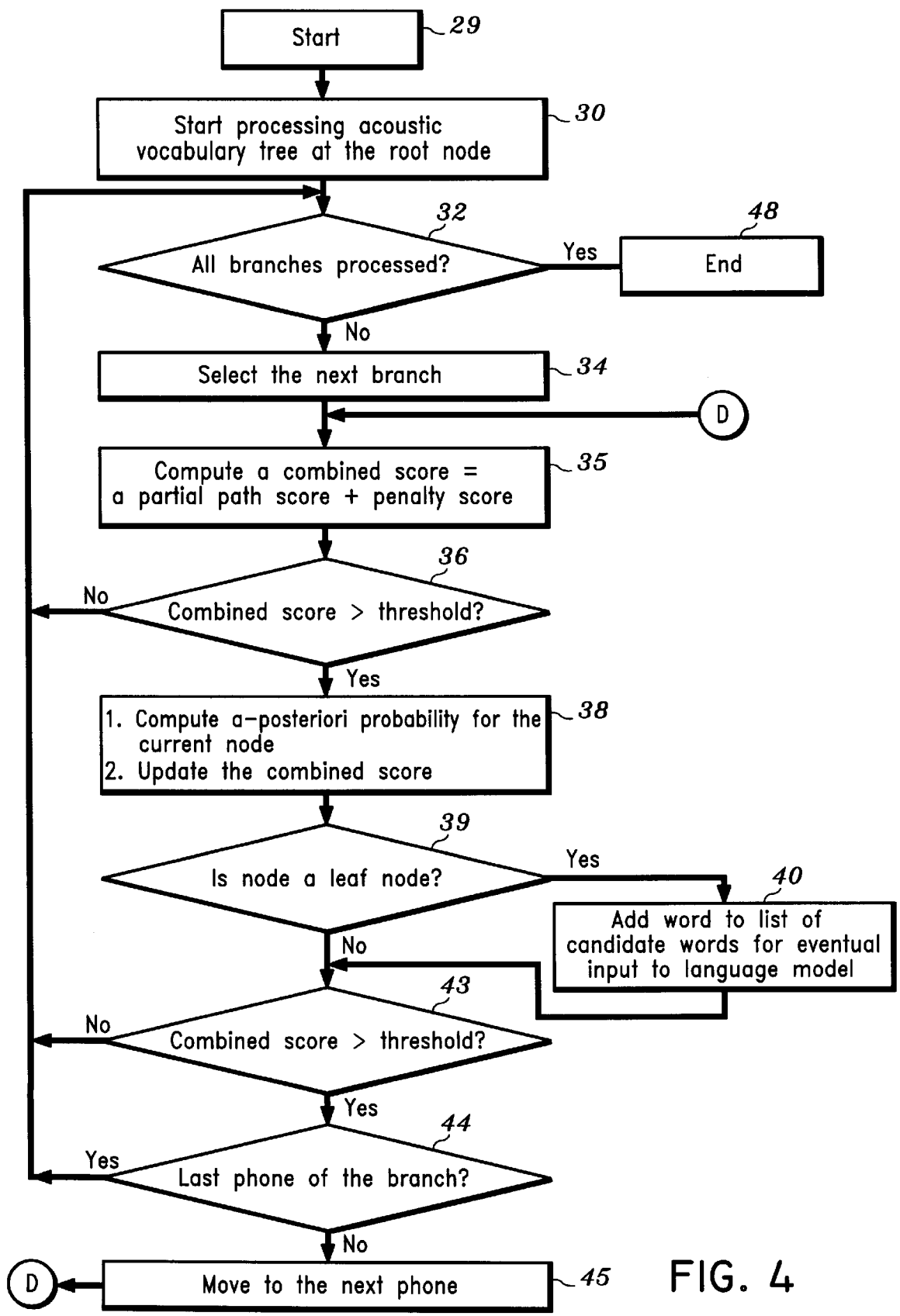
FIG. 4 is a flowchart illustrating an acoustic fast match according to the present invention.

Referring now to FIG. 4 which illustrates a flow diagram describing the method steps associated with the acoustic fast match in accordance with the teachings of the present invention. It is assumed that a sampled speech waveform has been pre-processed by the acoustic front end 104 into discrete intervals of speech of a particular time duration. In the preferred embodiment, the input waveform is divided into 10 millisecond speech frames by the acoustic front end 104. Other intervals of time may be considered by alternate embodiments. The process starts at step 30. Given some discrete interval of speech as input, the acoustic vocabulary tree is traversed by starting at the root node. The root node has no weighting associated with it and is thus referred to as a virtual node. Step 32 is a determination step to decide whether all branches in the acoustic vocabulary tree have been processed. If yes, the algorithm is terminated at step 48. Otherwise, process continues at step 34 where one of the unprocessed branches is selected in accordance with a depth first search algorithm, well known in the art. At step 35 a combined score is computed as the sum of a partial path score and a penalty score. The partial path score is computed as the sum of the a-posteriori probabilities of those nodes traversed thus far in the present branch of interest. That is, the partial path score is the sum of all of the a-posteriori probabilities of each node in the current path of interest, extending from the root of the tree up to the current node of interest. The partial path score is added to the derived penalty score associated with the current node (i.e. the node at which the traversal algorithm is currently situated). At step 36 the combined score is compared against a global threshold. If the combined score is less than the global threshold, no further evaluation of the remaining unvisited nodes in the current branch of interest will occur and the process returns to step 32. Unvisited nodes are considered pruned nodes by the algorithm. Otherwise, the process continues at step 38 where two computations are performed, first, the a-posteriori probability of occurrence of the phone represented by the current node is computed. Computing the a-posteriori probability involves comparing the current segment of speech being evaluated against a pre-stored statistical model and deriving an a-posteriori probability of occurrence which represents a measure of the degree of similarity. The statistical model is based on Hidden Markov Models. Secondly, the combined score for the current path of interest is then updated by the value of the computed a-posteriori probability. Process then continues at decision step 39, where it is determined whether the current node is a leaf node (i.e. a node representing a word from the vocabulary). If so, the process continues at step 40 where the acoustic vocabulary word represented by the identified leaf node is added as a candidate word to be supplied to the detailed match module 108 as a potential match. Otherwise, if the current node is determined not to be a leaf node, process continues at step 43 where the updated combined score is compared against the threshold again. If the combined score is less than the threshold, the process returns to step 32. Otherwise, the process continues to decision step 44. At decision step 44 a determination is made as to whether the current node of interest represents the last phone in the current branch of interest. If so, the process returns to step 32. Otherwise the process continues at step 45 where the next node (phone) in the branch becomes the current node of interest. The process then returns to step 35.

The steps described in detail above are repeated for all segments of input waveform as needed by the search algotithm. The process outputs a list of candidate words for further evaluation by a detailed match module 108.

Thus as described above, the present invention provides a method for eliminating the effect of increased vocabulary size on the speed of the fast match. Accordingly, the fast match is able to rapidly identify a small set of candidate words from the whole acoustic vocabulary for further evaluation independent of the vocabulary size.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. In a speech recognition system a method for fast match processing comprising the steps of:
   (a) computing an a-priori probability of occurrence for each word from an acoustic vocabulary;
   (b) deriving a penalty score for each word from said acoustic vocabulary based on each word's a-priori probability of occurrence in an input spoken text; analyzing said input spoken text for:
   (c) computing a path score for each word from said input spoken text, wherein step (c) further comprises the step of constructing an asynchronous tree structure comprising a plurality of branches, leaf nodes, and non-leaf nodes, each leaf node representing one of said words from the input spoken text and each non-leaf node representing a single phone of one or more said words from the input spoken text, wherein each of said leaf nodes is assigned a penalty score in accordance with the word associated with the leaf node and non-leaf nodes are assigned penalty scores derived from leaf node penalty scores, the step of assigning penalty scores for non-leaf nodes from leaf node penalty scores further comprising:
   identifying a non-leaf node in the tree that is a parent node to at least one leaf node;
   determining whether there is more than one identified child leaf node;
   based on the determination step, whenever there is more than one identified child leaf node, choosing the penalty score associated with the child leaf node whose penalty score is most positive, otherwise, whenever there is only one child leaf node, selecting that child leaf node's penalty score; and
   (d) combining the computed path score with the derived penalty score to form a combined score and testing the combined score against a threshold to determine top ranking candidate words.

2. The method of claim 1, wherein step (a) further comprises sorting the acoustic vocabulary into a sorted list in accordance with each vocabulary word's a-priori probability.

3. The method of claim 2, wherein step (b) further comprises deriving said penalty scores as a function of each words position in the sorted list.

4. The method of claim 3, wherein said function is a non-decreasing function.

5. The method of claim 1, wherein step (c) further comprises performing a depth first traversal on said asynchronous tree structure.

6. A computer program device readable by a machine, tangibly embodying a program of instructions executable by the machine to perform method steps for fast match processing, comprising the steps of:

(a) computing an a-priori probability of occurrence for each word from an acoustic vocabulary;

(b) deriving a penalty score for each word from said acoustic vocabulary based on each word's a-priori probability of occurrence in an input spoken text; analyzing said input spoken text for:

(c) computing a path score for each word from said input spoken text, wherein step (c) further comprises the step of constructing an asynchronous tree structure comprising a plurality of branches, leaf nodes, and non-leaf nodes, each leaf node representing one of said words from the input spoken text and each non-leaf node representing a single phone of one or more said words from the input spoken text, wherein each of said leaf nodes is assigned a penalty score in accordance with the word associated with the leaf node and non-leaf nodes are assigned penalty scores derived from leaf node penalty scores, the step of assigning penalty scores for non-leaf nodes from leaf node penalty scores further comprising:

identifying a non-leaf node in the tree that is a parent node to at least one leaf node;

determining whether there is more than one identified child leaf node;

based on the determination step, whenever there is more than one identified child leaf node, choosing the penalty score associated with the child leaf node whose penalty score is most positive, otherwise, whenever there is only one child leaf node, selecting that child leaf node's penalty score; and (d) combining the computed path score with the derived penalty score to form a combined score and testing the combined score against a threshold to determine top ranking candidate words.

7. The computer program device of claim 6, wherein step (a) further comprises sorting the acoustic vocabulary into a sorted list in accordance with each vocabulary word's a-priori probability.

8. The computer program device of claim 7, wherein step (b) further comprises deriving said penalty scores as a function of each words position in the sorted list.

9. The computer program device of claim 8, wherein said function is a non-decreasing function.

10. The method of claim 6, wherein step (c) further comprises performing a depth first traversal on said asynchronous tree structure.

* * * * *